April 5, 1966 J. R. BEST 3,244,302
FIBROUS GLASS AIR FILTERS
Original Filed Dec. 26, 1957 4 Sheets-Sheet 1

INVENTOR.
JAMES R. BEST
BY
ATTYS.

3,244,302
FIBROUS GLASS AIR FILTERS
James R. Best, Livonia, Mich., assignor to Owens-Corning Fiberglas Corporation, a corporation of Delaware
Original application Dec. 26, 1957, Ser. No. 705,292, now Patent No. 3,023,839, dated Mar. 6, 1962. Divided and this application Aug. 11, 1961, Ser. No. 130,929
11 Claims. (Cl. 264—269)

This invention relates to fibrous glass air filters, and particularly to self-supporting, disposable units of such air filters. The invention relates principally to methods and apparatus for producing filters of this type.

The present application is a division of copending application Serial No. 705,292, filed December 26, 1957, now Patent No. 3,023,839, which claims the structure of the air filter.

Filters of glass fibers, in which the fibers are coated with a sticky substance for holding particles impinged against the fibers, were first placed on the market over twenty-five years ago. Because of their high efficiency, long life and reasonable cost, they were rapidly established as the leading product in this field. Not only has their filtering function been superior to that of other competing media but their fibrous glass component could not be excelled in qualities of durability, inertness to corrosive agents, lack of absorbency and fire deterence.

This leadership has been so marked that fibrous glass filters now constitute a major portion of the filtering units in use. Domestic air conditioning and heating installations in which air is forcibly moved by a fan or blower at present comprise the largest field for fibrous glass air filters, both as original equipment and for replacement purposes.

With some two million home or room air conditioners, requiring from one to twenty filtering units, sold each year, and the greater quantity of air conditioners and forced air heating equipment previously installed, the great size of this market may be visualized. The recognition of the definite benefits of the filtration provided, by which dust, dirt, lint and pollen are removed from the air before it reaches occupied areas, accounts for the wide demand and use of the product in such air handling apparatus.

The outstanding commercial success of fibrous glass filtering units may not be credited solely to the superior inherent qualities of this filtering media, as the attractive, economical, simple form in which these units have been produced as well as excellent sales promotion and service facilities have contributed tremendously to the public acceptance of this product.

The design of the air filter unit, in view of its apparently ideal construction, has remained substantially unchanged since its original introduction many years ago. Like that of the Model T, at the height of its success, it has been accepted as the ultimate in ruggedness, efficiency and economy. However, it has also possessesd a pleasing and attractive appearance.

The structure of this unit involves, as a basic core, a loosely packed panel of glass fibers bound together by small particles of a resinous binder. The fibers are coated with a thin, transparent film of a viscous, non-volatile oil to retain air borne particles impelled against the fibers by the air movement.

This panel is confined between two closely perforated sheets of bright brass, which, as seems widely known, is scrap from bottle cap plants. This unnatural source for the material is particularly intriguing in view of the high qualifications of the product as well as its economy. The circular orifices of the perforated stock are placed as closely together as possible and so account for nearly ninety percent of the total sheet area.

The fibrous glass panel and the pair of confining perforated sheets are held together within the inwardly facing U channel of a hollow frame of sturdy but inexpensive fiberboard, decorated and reinforced by an overlay of imprinted paper tape. The side pieces of fiberboard are stapled together at their ends to form the corners of the frame.

For extra strength, a narrow metal strip extends across each face of the filter unit over the perforated sheet between midpoints of one pair of opposite sides of the frame. Should the filter be rectangular the longer sides are connected by these bars. The flat ends of the strips are stapled to the fiberboard frame and the main portions of the strips are strengthened by being formed with a V cross section with the open end of the V facing against the associated perforated sheet.

The air filter assembly accordingly is composed simply of the impregnated glass fiber core, the tape covered fiberboard frame, the two perforated sheet metal retainers and the two plain metal strips. This air filter package has a record of successful performance and sales from practically the advent in commercial volume of fibrous glass.

While several standard sizes have accounted for most of the many millions of theses air filters produced, they are commonly available in thicknesses from one-half to two inches and with varying dimensions to provide filtering areas between one-half and four square feet.

Vitally concerned competitors and others seeking benefits from the broad market involved have so far failed to present products of rivaling qualifications. Confronting the well established success and the obvious merits of this product, as well as being aware of the attempts of others to develop improved articles, applicant has, manifestly, been quite ingenuous to undertake the task of discerning inconspicuous weaknesses in the structure and operation of this commercially secured air filter and in creating a new product which not only obviates such weaknesses but also yields additional benefits with its manufacture and use.

In his extended study of the fabrication procedures and performance of the presently successful air filter product, applicant noted certain deficiences and features capable of betterment which it is his purpose to overcome or improve through this invention. There is, for instance, an appreciable amount of hand work in the present air filter production line for which may be substituted more automatic operations under the teachings of his fresh conceptions. Manufacturing costs are further minimized through the use of even fewer and less expensive materials in the practice of this invention.

In addition, he has envisioned and created a design of air filter which may be compacted to less than half of its regular volume for shipment and storage whereby the costs of transportation and merchandizing are materially lessened.

His observations revealed that through the lack of positive attachment between the fibrous glass panel and the fiberboard frame occasional slumping or undulation of the filtering media occurred under the duress of heavy jarring. Such deformation weakens the filtering efficiency by forming openings between the edge of the panel and the frame through which air may bypass the filtering media.

This lack of attachment also permits greater centripetal drawing and depression of the fibrous stock under the pressure of the air movement. The resulting compacting against the retainer sheet on the outlet side increases the resistance of the filter to the air flow and weakens the filtering function. The design of air filter provided by applicant mitigates these objectionable characteristics by establishing a firm union between the edges of the panel and the framing member.

Other objects and advantages ensuing from the adoption of the air filter of this invention are improved appearance, greater strength and effectiveness, larger functioning area, more comfortable and easier handling properties, better retention in operating position, and ready disposability upon replacement.

The many benefits of the above recited objects as well as others brought forth in the following description are attained to a major extent through the utilization of a novel method of integrating the fibrous glass filtering panel with a simplified framing member. Through pressure and heat the resin binder component in the edges of the fibrous glass panel is employed to form a firm connection between the glass fiber body and, in the preferred embodiment, a fiberboard frame, at the same time that hot air sets the binder distributed through the balance of the massed glass fibers.

To engineers, chemists and other skilled technicians long associated with research and development of glass fiber products this procedure is quite an innovation and the resulting product a distinctly unique article. This view would likely be most surprising to others, less informed, who have come to regard fibrous glass as a common place commodity and evidently of a fibrous nature comparable to that of fibers in general.

In reality, glass fibers differ fundamentally from other fibers in almost all respects except name. Where the ordinary fiber is absorbent, a glass fiber is perfectly non-absorbent. Further, it is uniformly cylindrical, whereas most other fibers, both natural and synthetic, are of irregular form in cross section. While a fiber is commonly considered as soft and pliable, a fibrous glass fiber is hard and thoroughly resilient. Instead of a scaly or hairy surface of a clinging nature, the surface of a glass fiber is smooth. On a greatly enlarged scale, a mass of glass fibers contrasts with a group of ordinary fibers as does a tangle of steel wire with a collection of short lengths of limp cotton clothesline. These differing characteristics make the glass fibers peculiarly valuable, but also make them most difficult to manipulate.

The misconception of the character of glass fibers, drawn from the awareness of the high quantity of commercial products in which they are incorporated, is abetted by the continuous research and adaptation of the present fibrous glass basic products to new uses. This seemingly rapid progress in the development of fibrous glass for various uses has been over paths blocked by considerable difficulties, and accomplished only through an astounding amount of research and planning.

The forms and scope of use of fibrous glass are actually restricted within narrow limits, even though great volumes of the material are consumed. In this regard, the textile field, constituting one major market of the industry, utilizes fibrous glass in threads, yarns, strands, woven and unwoven fabrics. These products, in addition to their adaptation in general textile purposes, have been employed on a large scale as reinforcements in molded and formed plastic products.

The other main outlet for glass fibers has been roughly in panel or blanket form for insulation and filtering services. Some of these bulk products have been placed in envelopes or laminated with extensive sheet material. However, it is not believed that instances may be found where fibrous glass masses have been intimately united to narrow or frame-like supporting members as accomplished with this invention.

Other valuable features of the inventive concepts of this application are disclosed in the subsequent description and presented in the accompanying drawings. As may be observed, they are generally supplemental to or derived from the basic novel step utilized in integrally joining the filtering media panel with the supporting frame.

Figure 1:
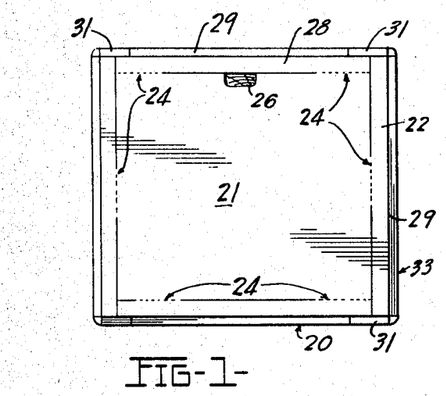
FIGURE 1 is a plan view of an air filter embodying a preferred form of this invention.

The air filter 20 of FIGURE 1 is shown with its air inlet side facing the viewer and with the temporary protective cover 21 still in place. This is removed by the customer before the unit is inserted in operative position in the air conditioner or heating plant with which it is to be employed. The protective cover is a part of the original die cut fiberboard sheet from which the frame 22 is also formed and is held thereto by only a few perforated connections 24 along its otherwise unattached border. These connections release easily when the cover is lifted off by means of the finger hole 26.

The frame 22 has a cross section of L shape with the base of the L forming the inturned flange 28 which is coplanar and semi-continuous with the cover 21, and with the upright portion of the L constituting the rectangular outer rim 29 of the frame. The rim 29 flares outwardly preferably at an angle of about one hundred and six degrees to the plane of the flange 28. The corners of the frame are somewhat flattened where the strips of paper tape 31, overlying the base fiberboard 32, are turned slightly around the corners, bridging the V openings between the ends of the straight side sections 33 of the outer rim 29. These various elements and their relation to each other are further illustrated in FIGURES 2 through 6.

Figure 2:
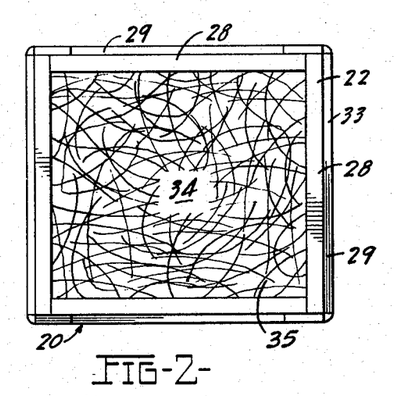
FIGURE 2 is a like view of the filter unit of FIGURE 1 after the protective cover is removed, preparatory to installation of the unit.

The same view of the air filter as that of FIGURE 1 is shown in FIGURE 2 but with the protective cover 21 removed. This reveals the fibrous glass filtering panel 34.

Figure 3:
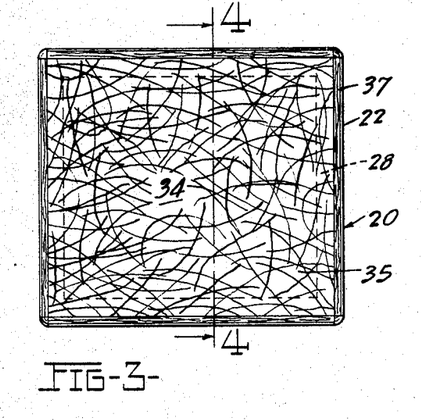
FIGURE 3 illustrates the opposite, or air outlet side of the filter unit of the preceding views.

In FIGURE 3 of the drawings the opposite, or air outlet, side of the air filter of FIGURES 1 and 2 may be seen. The filtering panel 34 of glass fibers has a main body 35 in which the fibers are held in a very porous mass, in this instance one inch thick, by a thermoset binder in minute particles mostly disposed at cross over contact points of the fibers. The porous center body 35 of the glass fiber panel 34 is rapidly reduced in thickness along its border as it merges into the highly compacted edge 37 which is integrally adhered against the inner surface of the sections 33 of the rim 29.

This union between the filtering panel 34 and the frame 22 is secured at the same time that the uncured binder in the main filtering body 35 is set by heat, by holding the edge portion of the panel compressed tightly against the side rim 29 of the frame, and setting the binder which has been partially squeezed to the surface of the edge portion of the fibrous glass mass in contact with the fiberboard side elements 33 of the rim. The binder component therefor serves in this area not only to hold the matted fibers of the edge in a firm web formation but to cement the thin web edge solidly to the fiberboard frame.

Figure 4:
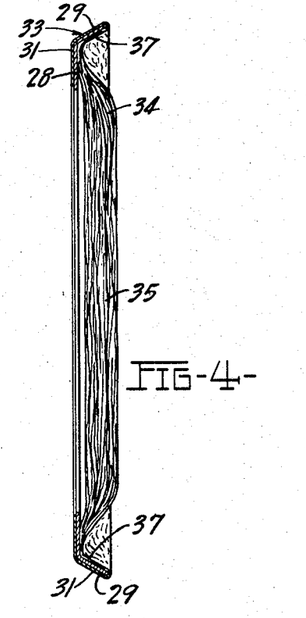
FIGURE 4 is an enlarged cross section of the air filter of FIGURE 3 taken on the line 4—4 thereof.
Figure 5:
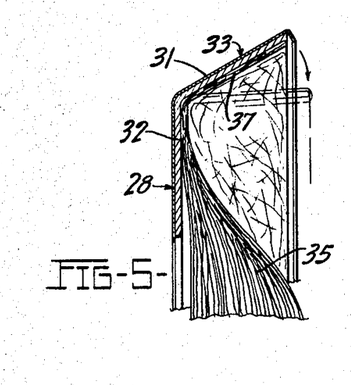
FIGURE 5 is a further enlarged view of the section of the edge only of the air filter, corresponding to the edge section at the top of the presentation of FIGURE 4.
Figure 6:
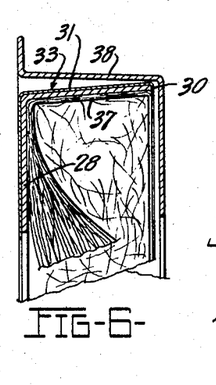
FIGURE 6 is a view similar to that of FIGURE 5 showing how the flexible sides may be compressed inwardly to fit an air filter holding bracket within an air duct or chamber, and how the resilience of the sides keeps them in sealing contact with the bracket and helps to retain the filter unit in position.

The integrated lamination is illustrated in the sectional view of FIGURE 4 and in the enlarged edge sections of FIGURES 5 and 6. With the curing of the binder, transverse strength and tautness is developed in the filtering panel 34 as it stretches across between its tight junction with the periphery of the rigid frame. This is derived at least in part from the fact that the glass fibers of the panel lie generally in planes running generally parallel with and crosswise of the panel. The sturdiness of the fiberboard base of the frame is also considerably augmented by the reinforcing effect of the webbed edge of the panel bonded to it. With a pack of the character herein described the webbed edge would be about one sixteenth of an inch in thickness.

Figure 7:
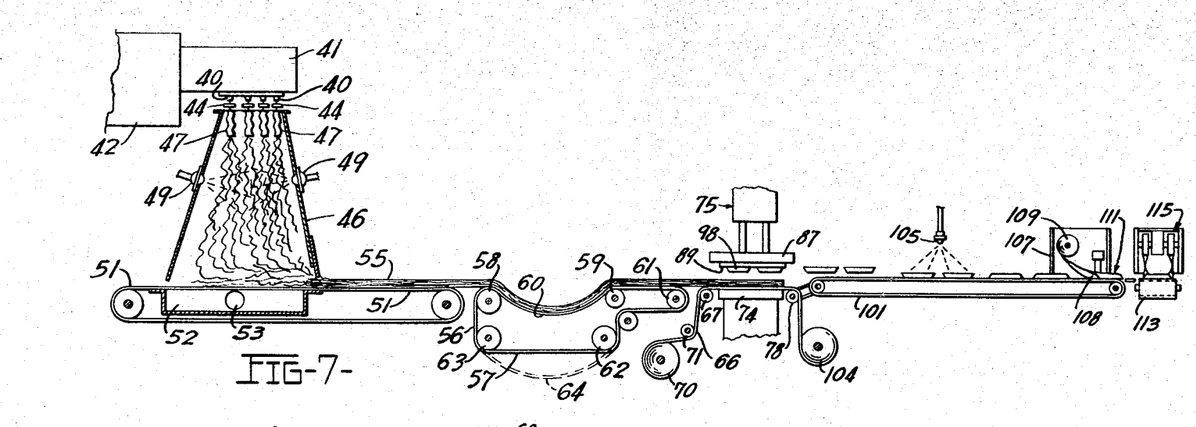
FIGURE 7 is a diagrammatic, longitudinal section of a production line adapted to the fabrication of air filters according to this invention.

In FIGURE 7 is shown schematically a production line adapted to fabricate air filter units according to this invention. As depicted therein, molten glass is discharged in fine streams from ported bushings 40 projecting downwardly from the forehearth 41 of the glass melting tank 42. Air or steam jets from manifolds 44 draw the fluid streams of glass into filaments or fibers which are driven downwardly within forming hood 46. If a curly form of glass fiber is desired for the purpose of giving the resulting mass of collected fibers a more bulky nature, the steam or air blasts are constrained with the fibers through undulating channels within guide members 47 mounted immediately below manifolds 44.

As the fibers descend within hood 46 a binder solution is dispersed through them by spray nozzles 49 projecting through the walls of the hood. The binder material is preferably a phenol formaldehyde solution extended twenty percent with an emulsion of vinsol, a rosin derivative. Binders of urea and melamine formaldehydes also perform effectively as would numerous other natural and synthetic resins. For purposes of this invention, a proportion of twenty three percent by weight of solidified binder in the final fibrous glass pack gives very satisfactory results. The amount would vary with different fiber diameters and the strength needed in the final product. Impregnated with the atomized binder, the fibers collect on the foraminous receiving conveyor 51, moving, for example, at the rate of forty-two feet per minute across the bottom of the hood.

Below the upper course of conveyor 51 is a suction chamber 52 into which air is drawn down through the conveyor to aid the gathering of glass fibers thereon. The air moving into chamber 52 is exhausted through outlet 53 by a suitable blower or fan.

Glass fibers of a diameter of about one hundred and forty hundred thousandths of an inch have been found particularly suitable for air filters of this invention. However, fibers with diameters ranging up to two hundred and fifty hundred thousandths have progressively greater strength to oppose high velocity air movement and may be used for this reason; and much finer fibers are employable where the delivery force of the air flow is sufficient to overcome the added resistance their use incurs. This flow blocking property is the main deterrent to the employment of finer fibers as filtering efficiency increases moderately as the fiber diameter is reduced.

For purposes of illustration the thickness of the glass wool pack 55 formed on conveyor 51 will be considered as consolidatable at one inch, a common thickness dimension of the fibrous glass filters now in use. The original pack is usually somewhat fluffed up and is brought down to a uniform thickness by a light compression cylinder. The density of the pack may vary within a substantial range but will be considered here as about one half pound per cubic foot.

The pack 55 is delivered by conveyor 51 to surge conveyor 56. The latter comprises an endless belt 57 advancing over the continuously driven drum 58. The latter has a positive driving connection with belt 57 which may comprise sprocket teeth around its ends meshing with a series of teeth receiving openings along the borders of the belt. The belt runs forwardly around intermittently rotated drum 59 with which it also has a positive sprocket type engagement.

On momentary stopping of drum 59 the stretch of belt 60 between it and drum 58, with the glass fiber pack upon it, sags downwardly since the feed of the pack and the movement of the belt 57 over drum 58 are maintained uninterrupted. With the renewal of rotation of drum 59, at a peripheral speed more than double that of drum 58, and the corresponding movement of the traveling pack, the slack between the drums 58 and 59 is rapidly taken up. The belt 57 advances over roller 61, synchronized in rotation with drum 59, and returns beneath idle rollers 62 and 63. Here, the belt accumulates in a downward reserve loop 64 to supply extra belt length to be used in the next sagging section of the belt between drums 58 and 59 when the latter is again momentarily held from rotation.

As the glass wool pack moves over roller 61 and away from riding contact with belt 57, the support and movement of the pack is transferred to the continuous die cut fiberboard web 66, indexed and driven like a camera film over a pair of sprockets 67. Strips 68 along the edges of the web, as may be seen in FIGURE 8, act as carriers of the web and each has a series of sprocket engaging perforations 69. The fiberboard web is drawn from a supply cylinder 70 over guiding roller 71 and stretches across the lower platen 74 of press 75 from sprockets 67 to synchronously driven sprockets 78.

The web 66 incorporates the fiberboard, of a gauge which may be approximately four hundredths of an inch, of which frame 22 and the protective cover 21 is formed. The fiberboard is preferable of common chipboard composition, but may of course be of similar materials such as binders board, jute board or thinner pressboards. Other more expensive products including plastic sheeting and stiff fabrics are equally feasible. To facilitate fabrication, the fiberboard web is previously die cut, as indicated in the view of a portion thereof presented in FIGURE 8. As there disclosed the web is sixty inches wide to adapt itself to a fibrous glass pack of similar width to form multiple rows of air filter units.

Figure 8:
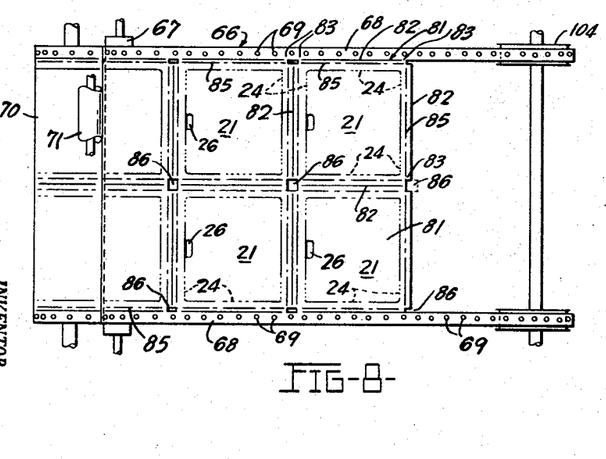
FIGURE 8 is a plan view of a portion of a die cut fiberboard strip utilized in the operation of the production line of FIGURE 7.

The web is divided into square sections 81 with each containing the material for a single air filter. Each section is outlined by a through cut 82 interrupted occasionally by a narrow bridge 83 to hold the section in place in the web. The protective cover 21 has quite a free edge except for the short perforated connections 24. Dash-dot lines 85 indicate indentations in the web where the fiberboard will be bent to form the angled joint between the sections of the inturned flange 28 and the flat outer sides 33 of the frames 22.

Openings 86 at the corners of the sections 81 permit upward turning of the sides of the frame without interference from excess material. The indexing mechanism is arranged to stop the pack feeding drum 59 (and the coacting roller 61) and simultaneously stop the webcarrying sprockets 67 and 78 when the die cut elements of the web are in matching relation with the allied shaping parts of the lower platen 74 of press 75.

Figure 9:
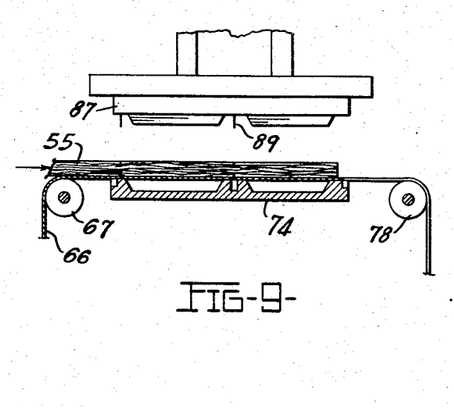
FIGURE 9 is a side elevation, partly in section, of the molding equipment incorporated in the production line portrayed in FIGURE 7.
Figure 10:
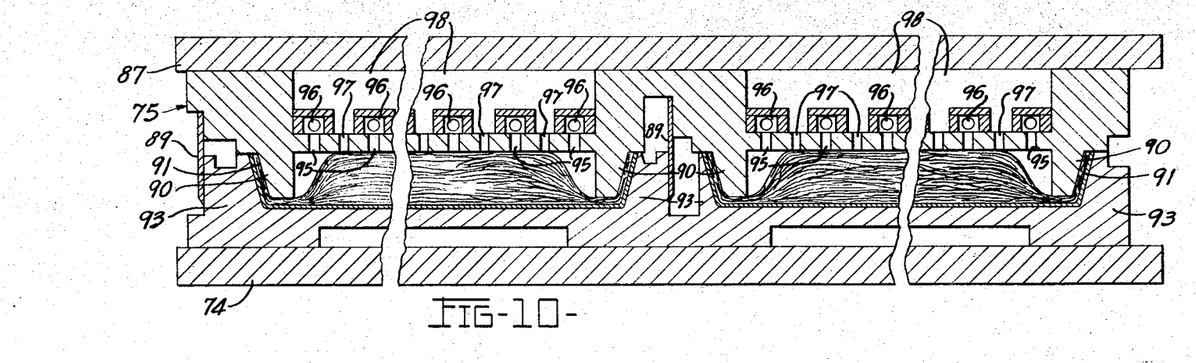
FIGURE 10 shows an enlarged section of the mold of FIGURE 9 in closed position.

With the fiberboard web, and the fibrous pack superimposed thereon, held momentarily stationary, the upper platen 87 of the press is driven downwardly with a pressure which may be in the region of one hundred pounds per square foot. A projecting knife formation 89 as shown in FIGURES 9 and 10 first cuts through the glass pack and then severs the narrow bridges 83 of the fiberboard thereby separating the square sections 81.

The fibrous glass is then compressed downwardly by ridged sections 90 of the upper platen against the back of the bands of fiberboard which becomes the inturned flange portions 28 of the frames. The inclined sides 91 of the sections 90 of the upper platen compact the adjacent portions of the fibrous glass pack against the strips of fiberboard, turned upward by projections 93 of the lower platen, which become the final outer rim 29 of the filter unit frame 22. To effect a fast cure of the binder component of the fibrous pack the platens are both maintained at a temperature of 600° F. to supply curing heat to the compressed portions of the fibrous pack, and air at the same temperature is circulated down into the uncompressed main filtering body 35 of fibrous glass.

This air is forced into the mold cavity through openings 95 from a series of pressure chambers 96 and withdrawn by suction means through outlet openings 97 into vacuum chamber 98. The curing action is completed in a matter of seconds and the upper platen 87 is quickly raised after the required interval. For expeditious production the full molding cycle should not exceed ten seconds. With the continuous feed of the fibrous pack at the cited rate of forty two feet per minute from the forming hood interrupted for such a period there will be an excess of seven feet of the pack which must be temporarily accumulated in the sagging loop 60 of the surge conveyor 56.

As the feed of the pack of glass fibers from the forming hood 46 and the production rate of the molding operation must be closely coordinated, the mold herein described should form within the ten second period filter units from a length of seven feet of the fibrous glass pack 5. With the four unit molds shown in the drawings the filters would have a cross width of thirty inches, or one-half the width of the pack, the latter being here taken as five feet, and a width lengthwise of the conveyor movement of forty-two inches. The dimensions of the mold would accordingly be, in this case, five feet in width and seven feet long. Filters of the above dimensions are exceptionally large, and the mold would be more apt to be designed to form sixteen units fifteen by twenty-one inches in area.

Figure 11:
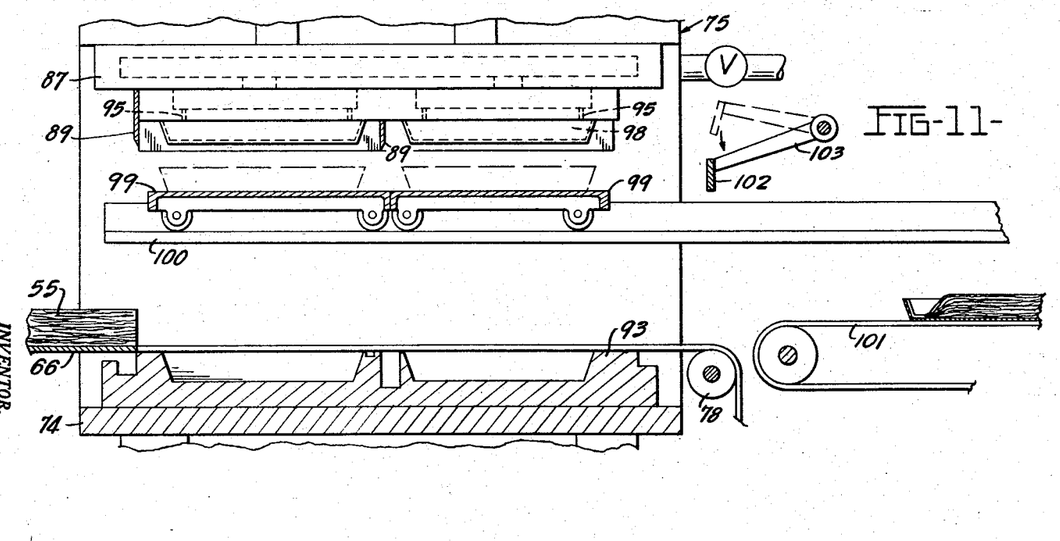
FIGURE 11 is a similar view on a smaller scale of the mold in open position, immediately after a forming operation, and with the shaped filter units held suspended, against the upper platen.

Immediately upon partial raising of the upper platen 87, insertion of the following portions of the fiberboard web and the fibrous glass pack surmounted thereon may be initiated. This is permissible as the formed air filter units are raised with the upper platen 87.

At the instant the upper platen is ready to move upwardly the injection of heated air through ports 95 is terminated while the suction of air into outlets 97 is continued. This creates a vacuum within the chambers defined between the platen surface and the temporary covers 21 at the bottoms of the filter units. These chambers are bordered by the upturned side sections 33 of frame form members 29. This suction holds the units to the upper platen. It should be here observed that the fiberboard not only has served as a mold loading conveyor but also facilitates mold releasing action by its unadhering contact with the lower platen 74.

As soon as the upper platen 87 reaches its top position with the vacuum held air filter units suspended beneath, the reciprocable tray 99, with wheels riding upon side rails 100, is brought beneath the upper platen and the units drop there upon as the vacuum is terminated by air being again forced out ports 95.

The tray 99 is rolled quickly forwardly out of the way of the now descending upper platen and continues to hold the air filters until it again is reciprocated back under the upper platen, following the latter's next upward trip. Upon this return of the tray the air filters are pushed off upon the receiving conveyor 101 by the temporarily interposed gate bar 102 supported on rocking arm 103.

The only portions of the continuous fiberboard web 66 remaining after the molding operation are the two side carrier strips 68; after pulling the web and the fibrous pack into the press through their engagement with sprockets 78 these strips have fulfilled their transporting and indexing functions and are wound for discarding upon a pair of reels 103 on opposite sides of conveyor 101.

A battery of spray devices 105 mounted over conveyor 101 applies a non-drying, non-volatile mineral oil upon the fibrous glass filtering panels. This oil is initially sufficiently fluid to spread and form a permanent film over the individual glass fibers and is the adhesive medium holding particles which impinge against the fibers when the filter is in its functioning environment. It is recommended that the oil be applied in a quantity comprising about twenty percent by weight of the filtering mass of bonded glass fibers.

After being coated with the particle retaining substance, the filter units are mechanically turned upside down and arranged in single file for movement through a first gummed paper tape applying station 107. Here the moistened tape 108 is delivered from supply rolls 109 and pressed by applicator guides 111 against the side sections of upwardly facing flange 28 of the filter units, and folded down over the two opposite flat outer sides 33 of the rim 29, which are then lying in line with the conveyor travel. Preferably the lower edge of the tape is tucked beneath the edge of the adjacent side 33 resting upon the conveyor to form a flap 30 as shown in FIGURE 5. This smooths the edge for more confortable handling. As the tape is thus applied it is cut in proper lengths to fit the border portions of the frames here involved.

Then the filter units are turned ninety degrees, or as shown in FIGURE 7, are dropped upon a sequential conveyor 113 running at right angles across the end of conveyor 101. This orients the units for the application of tape along the two other opposing sides thereof at a second tape applying station 115. The guiding means 116 in this instance turn the ends of the short bands of applied tape a short distance around the ends of the outer sides 33 to form corners of the frame and connect the ends of such sides with the adjoining ends of the sides then extending cross-wise of the conveyor.

Figure 12:
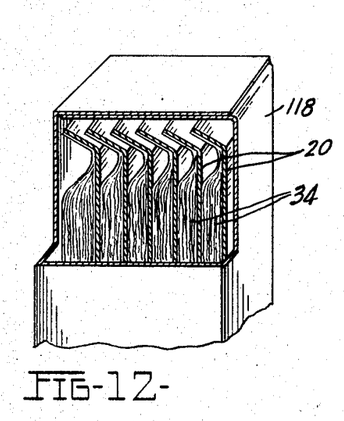
FIGURE 12 is a sectional view showing the nesting arrangement by which the air filters may be compactly packed within a carton for shipment and storage.

With this second tape application step the fabrication of the air filters is completed and they are ready for packing and shipment. Through the outward flare of the outer sides 33 of the frame 22 and the compressibility of the fibrous glass panel 34, the units may be nested and compacted within a carton as illustrated in FIGURE 12. So arranged, they require at most only half the space they would otherwise occupy, and shipping and storage space and costs are accordingly greatly minimized. At the same time the bonded fibrous glass pack has sufficient resilience to recover its proper functioning thickness when the carton is opened and the pack is released from its compressed state.

The novel aspects of the manufacturing procedure, as above described, are believed to encompass the use of the fiberboard web as a carrier and mold loading medium for the pack of fibrous glass; the forming of a frame for a mass of glass fibers by cohering under pressure an auxiliary element and a portion of the mass; curing the binder of one portion of a fibrous mass under pressure by direct contact with a heated surface while curing another uncompressed portion with a current of heated air; facilitating the mold release by a complete layer of fiberboard of which the main part is used in the molded product; lifting the formed units from the lower platen by suction established between the upper platen and the units; and finally the cooperation of various factors in synchronizing the molding operation.

Figure 13:
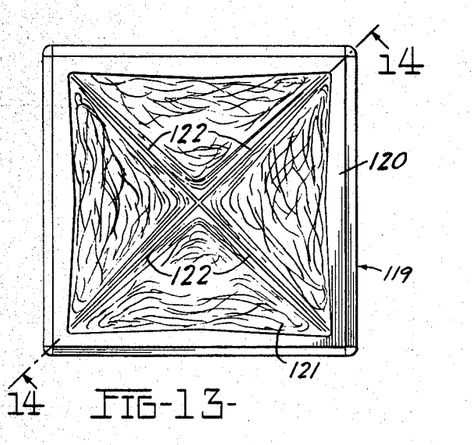
FIGURE 13 is a plan view of an air filter embodying a different form of the invention.
Figure 14:
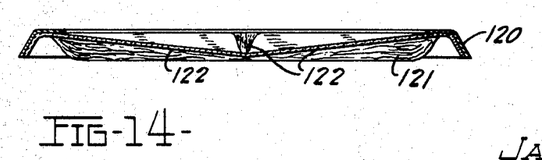
FIGURE 14 is a diagonal section of the air filter of FIGURE 13, taken along the line 14—14 thereof.

In FIGURES 13 and 14 an air filter embodying another form coming under this invention is depicted. This unit 119 has the fiberboard frame 120 welded through the cured binder with the fibrous glass filtering panel 121 in the same manner as the filter design constituting the main subject of this application. To provide special sturdiness the unit is equipped with a cross-shaped grid composed of compressed and bonded ribs 122 of the fibrous glass extending at an incline from the corners of the frame adjacent the air inlet side of the filter to an apex at the center of the filtering panel adjacent the plane of the outlet side of the filter. Such a grid structure receives the air flow thrust in tension and is not so inclined to bow under the force of the air stream as are reinforcing ribs running straight across between the sides of a filter frame.

Figure 15:
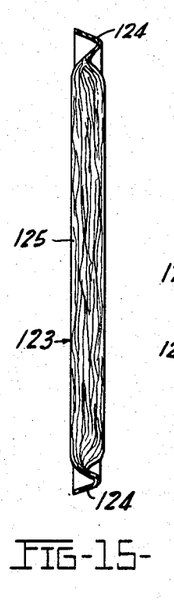
FIGURE 15 is a sectional view of a filter embodying a still further form of the invention.

In FIGURE 15 is shown an air filter unit 123 of another design incorporating features of this invention. In this embodiment the supporting frame 124 is made by compressing, and curing the binder of, the edge of the filtering panel 125 without the interposing therewith of an additional element of fiberboard or the like. A denser or thickness mass of fibrous glass better lends itself to this arrangement as a heavier, more rigid frame structure is then obtained. Instead of the fibrous binder, additive materials such as plastisols, asphalt, latex, or vinyls could be used in forming this frame.

The V section of the frame 124 permits units of this design to be nested together for compression packaging. Other shapes of frames such as ones having W, wide L, or straight single plane (other than vertical) sections could be likewise so fabricated and would also be capable of being compactly stacked.

Figure 16:
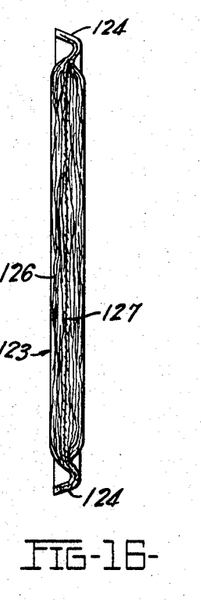
FIGURE 16 is a like view of a modified form of the filter of FIGURE 15.

To reinforce the main filtering portion of the panel 123, as shown in FIGURE 16, the fibrous glass stock of which it is formed could comprise two strata 126 and 126a of the regular fibrous medium with a layer 127 there between of an open weave fibrous glass fabric. Instead of a woven web, a fibrous glass screen, bonded scrim or mat of glass fibers could be used. To vary the filtering action and air resistant above and below the interlayer 127, glass wool of different densities or fiber size could be used in the two strata.

The interlayer 127 is secured within the frame in the molding operation and thus provides the filtering area with extra strength to withstand the disruptive effect of heavy air flow. Such a lamination may of course be incorporated in the same manner in the body of an air filter unit of this invention having a fiberboard frame.

In discussing the use of an air filter unit of this invention, the design held mainly in mind will be that shown in FIGURES 1 to 6 and involved in the described manufacturing operations.

The user of the filter units ordinarily obtains them for replacement purposes from a hardware store or other retail distributor. With the style of unit to which this application principally relates, the surface of the removable cover 21 may carry a sales message in addition to instructions as to the best installation and replacement practices.

If taken light wrapped, by the customer, the cover provides protection fully to one side of the filtering panel and indirectly as a backing to the other side from disruptive contact with angular or pointed objects. The cover further acts as a shield to limit manual contact with the fibrous portion of the filter which naturally has a somewhat oily feel. The edge flap 30 of gummed tape turned inwardly over the edge of the sides 33 of the frame also helps to afford a smoother grasping area.

When the customer is ready to install the unit in his air conditioner or heating system the protective cover 21 is readily removed by means of the fingerhold 26. Upon insertion of the air filter into a receiving bracket (such as 38 in FIGURE 6), the light springiness of the sides 33 permits them to be depressed to fit the particular variations from standard dimensions possessed by the bracket, and at the same time inclines them tightly against the surfaces of the bracket to form a seal to prevent air leakage there between, and to hold the air filter in place. This effective fitting arrangement, as illustrated in FIGURE 6, cooperates with the integrating connection between the filtering panel 34 and the filter frame 22 to insure that all the air handled by the heating or conditioning system passes through the glass fiber filtering medium.

As there are no protective or supporting members across the faces of the filtering panel its full area within the frame is open to the entry and passage of air. With the edge of the glass panel unattached to the inwardly projecting flange 28 of the frame, the effective filtering area is further increased as a portion of the air may turn under this flange and pass through the border of the panel lying beneath it. This path for the air is made more accessible by the force of the air movement depressing the filtering mass down away from the flange 28.

The thin compressed edge 37 of the fibrous panel lays with the straight sides 33 of the frame to which it is joined in planes generally parallel with the air flow and therefore these elements do not present substantial surfaces opposing the air movement. There are no frame parts on the outlet side of the filter panel overlapping its edge.

The free bowing of the glass fiber panel under the pressure of the air flow, unobstructed by a retaining element such as a perforated sheet or screen, minimizes compacting of the mass and the associated retarding of the air movement and lowering of the filtering effectiveness. The bowing does not become too extreme under normal air flow conditions because of the firm attachment of the panel with the frame and the transverse strength and tautness of the bonded glass mass.

When the filter becomes loaded with dust and other particles to a point where the air flow is materially reduced, the filter has accomplished its mission and should be discarded. The fact that it contains no metal, facilitates is disposal, as, for instance, should one of a smaller size be placed in an incinerator the only residue would be less than one tenth of a pound of loose glass particles.

While the prime merit of the invention resides in the utilization of a small number of standard, inexpensive components in a continuous, automatic production of filters of a simple design, the material specifications, and methods involved may be varied within a wide range. Also, possible alternate forms, other than those so far disclosed, should not be disregarded, even though they may be of a less desirable and more complicated nature.

As illustrative of this aspect, even though fiberboard is considered a superior material as a base for the frame of the air filters built according to this invention, molded plastic, light wood and metal structures could quite feasibly be incorporated as frame members, with the fibrous glass filtering panel bonded thereto. A stronger frame would be thus created; but the extra strength would not ordinarily be required and the added cost and weight would be objectionable.

As another instance, glass fibers have alone been referred to herein. However, other mineral wools could be substituted therefor without too severe a loss of the benefits of the invention, as, while generally considered to be inferior, they have properties similar to those of fibrous glass.

Then, too, exact detail figures should not be accepted so rigidly. As for example, it is obvious that thinner berboard than that of the thickness of .04 inch cited would likely serve well but with some reduction in trength. It is likewise apparent that the flaring of the ides of the frame could be at a different angle than that f 106° selected. Nesting capacity would be increased with larger angles with some attendant loss in strength.

An alternate fabricating method could include the application of a cementing substance, distinct from the inder component of the fibrous glass, for joining the brous glass pack to the frame. This could be accomplished after the glass wool is dimensionally stabilized hrough curing of the binder, but would thus require additional handling.

Another fabrication procedure could comprise the primary curing of the filtering panel and then stitching or tapling the compressed edge of the panel against a simple frame member or between clamping parts of a composite frame. Such a method may be plausible sounding but actually is not very practical as, with it, the intractable haracteristics of fibrous glass would be apt to cause rouble.

It should be noted that the air filter of the principal lesign disclosed gives quite satisfactory service with the ide presented in FIGURE 1 as the air outlet face instead of being the inlet side as it is in the recommended positioning of the unit.

An alternate design of filter coming within this invention has the fiberboard, utilized in the removable cover, die cut to form a permanent, protective grill facing.

Also, while the paper tape is considered an important lement of the filter structure, its presence in some circumstances may not be essential. Without the tape the V openings between the ends of the straight fiberboard side ections are blocked to at least some degree by the bridging portion of the compressed web of fibrous glass.

In briefly reviewing the accomplishments of the invention, it should be noted that the disclosed method of abrication virtually eliminates hand work, is capable of precise and high volume production in a single line of operations, utilizes only a few materials with those being of an inexpensive nature, and incorporates devices and methods for effective, indexed loading and rapid unloading of the molding apparatus. More specifically the latter include the arrangement by which the fiberboard web carries the glass pack into the mold, the utility of the web as a mold releasing element, the dual use of air suction means in circulating curing air and raising by vacuum he formed filter units with the upper platen, and the breaking of the vacuum to drop the units upon a reciprocating tray.

In summarizing the features of the air filter of the invention, there is first the ease of handling and protection provided by the temporary cover. Of more practical importance is the flexible frame edge which facilitates itting the unit into receiving holders of varying dimensions and retains the unit therein. The resilient frame border urther cooperates with the firm connection between the iltering panel and the frame in sealing possible by-passing paths from the air stream.

The basic feature of the air filter is this bonded union of the filtering panel and the frame. In supporting the panel it prevents gap forming through slumping thereof is well as directly closing the junction line between the panel and frame. The strength given the panel through its connection with the frame is such that no supporting grids or bars across the faces of the panel are needed. Consequently, there is no interference with the air flow hrough the filter from such elements.

The effective area of the filter is further enlarged by he facts that the sides of the frame to which the compressed edge of the fibrous glass panel is secured lie in planes generally parallel with the line of travel of the air, that there is an inwardly directed flange on only the inlet side of the frame, and that the flange, being unattached to the fibrous media, permits air to turn beneath it into the filtering panel. Another valuable consequence of having the faces of the filtering panel unconfined is that the panel may bow under air pressure instead of losing its efficiency through compacting against a retainer.

The following claims are primarily directed to the principal features of the invention and may, in order to promote better understanding thereof, be couched in terms specific to preferred materials and methods. However, numerous substitute or alternate elements, whether or not suggested herein, are readily perceivable, and in view of the board scope believed possessed by the invention, specific terms of the claims should be interpreted as encompassing such elements.

I claim:

1. The method of forming a framed fibrous glass air filtering unit which comprises collecting glass fibers in a low density flat pack impregnated with an unset binding agent, placing rectangular framing material at one side of the pack, severely compressing an outline portion of the pack against the framing material with sufficient pressure to squeeze some of the unset binding agent outwardly into contact with the framing material, the portion of the pack surrounded by the outline portion being left substantially uncompressed, and then setting the binder of said outline portion, whereby the fibers therein are firmly bond together in a thin web and the web is adhered by the set binder to the framing material.

2. A method according to claim 1 in which the binding agent is set by heat.

3. A method according to claim 2 in which the binder of the outline portion of the pack is set by conduction of heat from contacting compression members and the binder in the portion surrounded by the outline portion is set by heated air circulating through it.

4. A method according to claim 1 in which the framing material is fiberboard.

5. A method according to claim 4 in which the fiberboard is in pre-cut sheet form.

6. A method according to claim 5 in which the pack is delivered to a compression and forming station upon and by a traveling web of the fiberboard pre-cut sheet.

7. In an apparatus for producing framed filtering units of fibrous glass, a forming station, a constantly moving conveyor for bringing a continuous fibrous glass pack toward the forming station, means between the conveyor and the forming station introducing a continuous web of fiberboard framing material in supporting relation beneath the pack, and intermittently operated feeding means delivering the web and the pack thereon at timed intervals into the forming station.

8. An apparatus according to claim 7 in which there are a pressure mold within the forming station by which sections of the fibrous glass pack are forced into compacted contact with portions of the web of fiberboard framing material, and curing means, associated with the mold sets the sections of the pack in attachment with the said portions of the web.

9. An apparatus according to claim 8 in which there are a vertically reciprocating upper platen of the pressure mold, means driving heated curing air downwardly through the platen into the fibrous glass pack, separate suction means withdrawing the heated curing air upwardly from the pack through other ports in the upper platen, and a control arrangement temporarily deactivating the means driving heated curing air downwardly through the platen as the forming action is completed with the upper platen in depressed position, whereby, upon upward movement of the platen the effect of the continued operation of the separate suction means may raise the said sections of the pack and the said portions of the web with the platen.

10. An apparatus according to claim 9 in which means interrupt the operation of the suction means when the platen reaches its top position and a tray is interposed beneath the platen to receive the pack sections and web portions thus released.

11. In a method according to claim 1, the steps of driving hot air downwardly into the portion of the pack surrounded by the outline portion to set the binder therein, forcefully drawing air upwardly therefrom to exhaust the hot air, after the binder is set discontinuing the driving of the hot air downwardly but continuing the forcefully drawing air upwardly thereby raising the cohered pack and framing material upwardly for delivery to subsequent finishing operations.

References Cited by the Examiner

UNITED STATES PATENTS

| | | | |
|---|---|---|---|
| 2,489,121 | 11/1949 | Collins | 154—44 XR |
| 2,923,068 | 2/1960 | Wells | 162—411 XR |
| 3,010,861 | 11/1961 | Reese | 156—199 |

FOREIGN PATENTS 218,229  12/1957  Australia.

EARL M. BERGERT, *Primary Examiner.*